United States Patent
Isoda et al.

(10) Patent No.: US 6,882,081 B2
(45) Date of Patent: Apr. 19, 2005

(54) ROTOR FOR ROTARY ELECTRIC ROTOR

(75) Inventors: Hitoshi Isoda, Tokyo (JP); Yoshihito Asao, Tokyo (JP); Masahiko Fujita, Tokyo (JP); Masaru Kuribayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/880,558

(22) Filed: Jul. 1, 2004

(65) Prior Publication Data

US 2005/0001508 A1 Jan. 6, 2005

(30) Foreign Application Priority Data

Jul. 1, 2003 (JP) ........................................ 2003-189743

(51) Int. Cl.[7] .......................... H02K 21/12; H02K 1/24; H02K 1/27; H02K 1/30
(52) U.S. Cl. .................................. 310/263; 310/156.66
(58) Field of Search ................................ 310/261, 216, 310/263, 156.66–156.73

(56) References Cited

U.S. PATENT DOCUMENTS

| | | | | |
|---|---|---|---|---|
| 2,672,564 A | * | 3/1954 | Krasno | ........................ 310/46 |
| 3,088,044 A | * | 4/1963 | Goss et al. | .................. 310/162 |
| 4,513,216 A | * | 4/1985 | Muller | ................... 310/156.68 |
| 6,448,680 B1 | * | 9/2002 | Akemakou | ............. 310/156.41 |
| 6,538,358 B1 | * | 3/2003 | Krefta et al. | ............... 310/263 |
| 6,608,424 B1 | * | 8/2003 | Kusase | ........................ 310/263 |

FOREIGN PATENT DOCUMENTS

| JP | 404251553 A | * | 9/1992 | .................. 310/263 |
|---|---|---|---|---|
| JP | 2002-247817 A | | 8/2002 | |

* cited by examiner

Primary Examiner—Tran Nguyen
(74) Attorney, Agent, or Firm—Sughrue Mion, PLLC (57) ABSTRACT

A cylindrical magnetic pole portion of a rotor core is constituted by first and second cylindrical magnetic pole sub-portions prepared as solid bodies. First and second magnetic poles are formed on the first and second cylindrical magnetic pole portions so as to be arranged in a circumferential direction so as to be separated from each other on an inner peripheral side by first and second recessed grooves recessed into an inner peripheral surface, and linked to each other on an outer peripheral side by first and second thin layer portions constituted by floor portions of the first and second recessed grooves.

16 Claims, 9 Drawing Sheets

ROTOR FOR ROTARY ELECTRIC ROTOR

BACKGROUND OF THE INVENTION

1. Field of the Invention

The present invention relates to a rotor for a rotary electric machine such as an electric motor or a generator, etc., mounted to an automotive vehicle such as an automobile, etc., or a marine vessel, etc., and particularly to a rotor core construction.

2. Description of the Related Art

Conventional rotor cores for rotary electric machines are constructed by laminating a plurality of steel plates relative to an axis of rotation, apertures for separating a field coil insertion portion and magnetic poles being disposed on each of the steel plates, and an outer peripheral surface thereof being formed so as to be smooth by disposing a thin layer portion so as to cover the apertures to suppress the occurrence of wind-splitting noise. (See Patent Literature 1, for example.)

Patent Literature 1: Japanese Patent Laid-Open No. 2002-247817 (Gazette: Claims)

However, in conventional rotors for rotary electric machines, because the rotor core is constructed by laminating steel plates, the strength of the magnetic poles themselves is reduced. Thus, the magnetic poles may disintegrate during high-speed rotation of the rotor, or stresses may occur in a magnetic pole portion during an assembly process in which a rotating shaft is pressed into the rotor core, deforming the magnetic poles themselves, etc. This deformation of the magnetic poles themselves brings about deterioration in dimensional precision, leading to increased irregularities in output from the rotor.

Furthermore, layers of air form easily between the laminated steel plates. When layers of air form between the laminated steel plates, magnetic resistance is increased, making output deteriorate.

SUMMARY OF THE INVENTION

The present invention aims to solve the above problems and an object of the present invention is to provide a rotor for a rotary electric rotor enabling disintegration and deformation of a magnetic pole portion to be prevented and increases in magnetic resistance resulting from layers of air inside a core to be suppressed by adapting a core shape and preparing a rotor core having smooth outer peripheral surfaces as a solid body to increase strength in the magnetic pole portion while reducing wind-splitting noise.

With the above object in view, a rotor for a rotary electric machine includes a field coil, and a rotor core having a cylindrical portion onto which the field coil is wound, yoke portions disposed so as to extend radially from first and second axial end portions of the cylindrical portion, and a cylindrical magnetic pole portion formed so as to be linked to the yoke portions and cover the field coil. The cylindrical magnetic pole portion is prepared as a solid body. A plurality of magnetic poles are formed on the cylindrical magnetic pole portion so as to be arranged in a circumferential direction so as to be separated from each other on an inner peripheral side by recessed grooves recessed into an inner peripheral surface of the cylindrical magnetic pole portion, and linked to each other on an outer peripheral side by a thin layer portion constituted by floor portions of the recessed grooves.

Therefore, disintegration and deformation of the magnetic pole portion are prevented by increasing strength in the magnetic pole portion while reducing wind-splitting noise, and increases in magnetic resistance resulting from layers of air inside the core is suppressed.

DETAILED DESCRIPTION OF THE PREFERRED EMBODIMENTS

Preferred embodiments of the present invention will now be explained with reference to the drawings.

Embodiment 1

Figure 1:
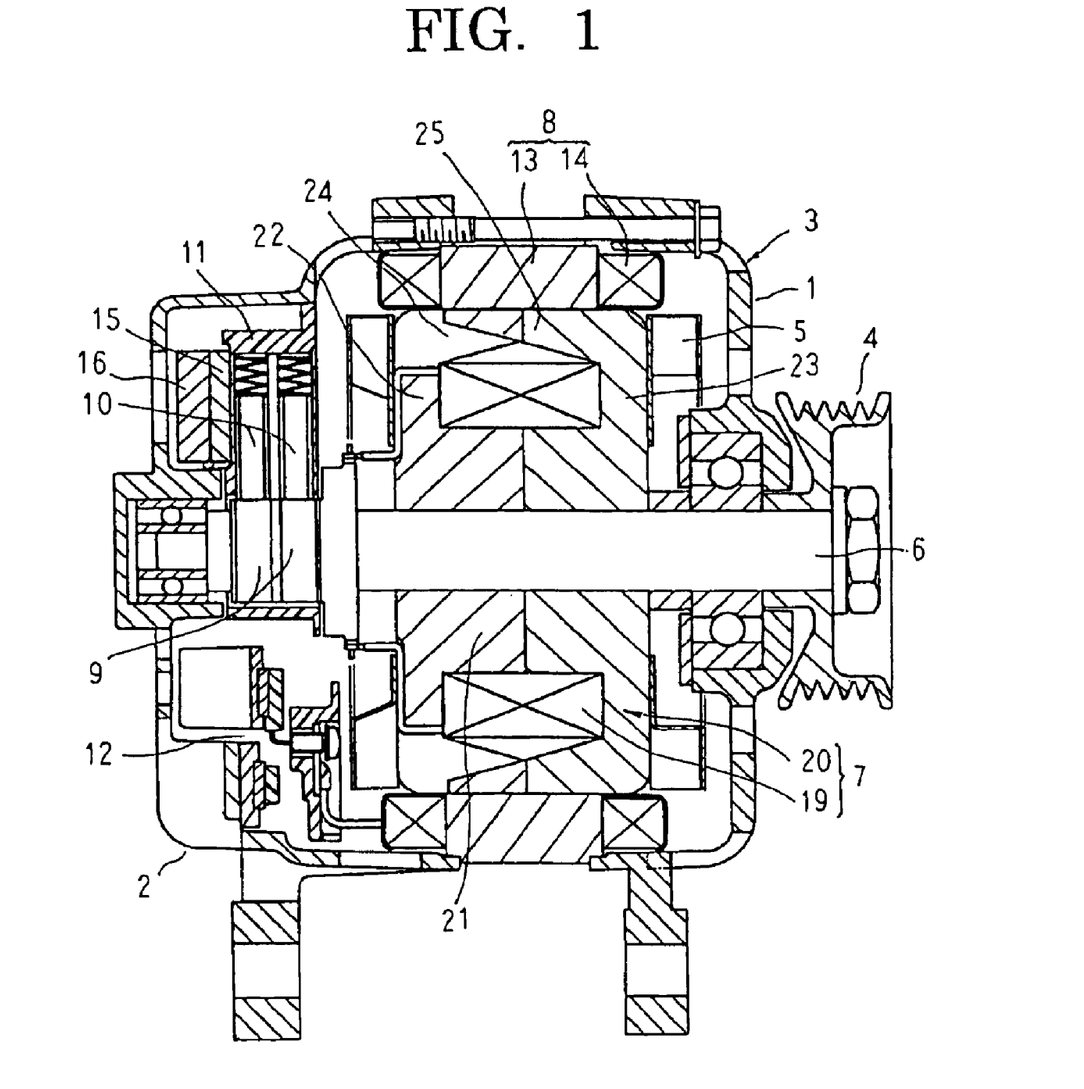
FIG. 1 is a longitudinal section showing an automotive alternator according to Embodiment 1 of the present invention.
Figure 2:
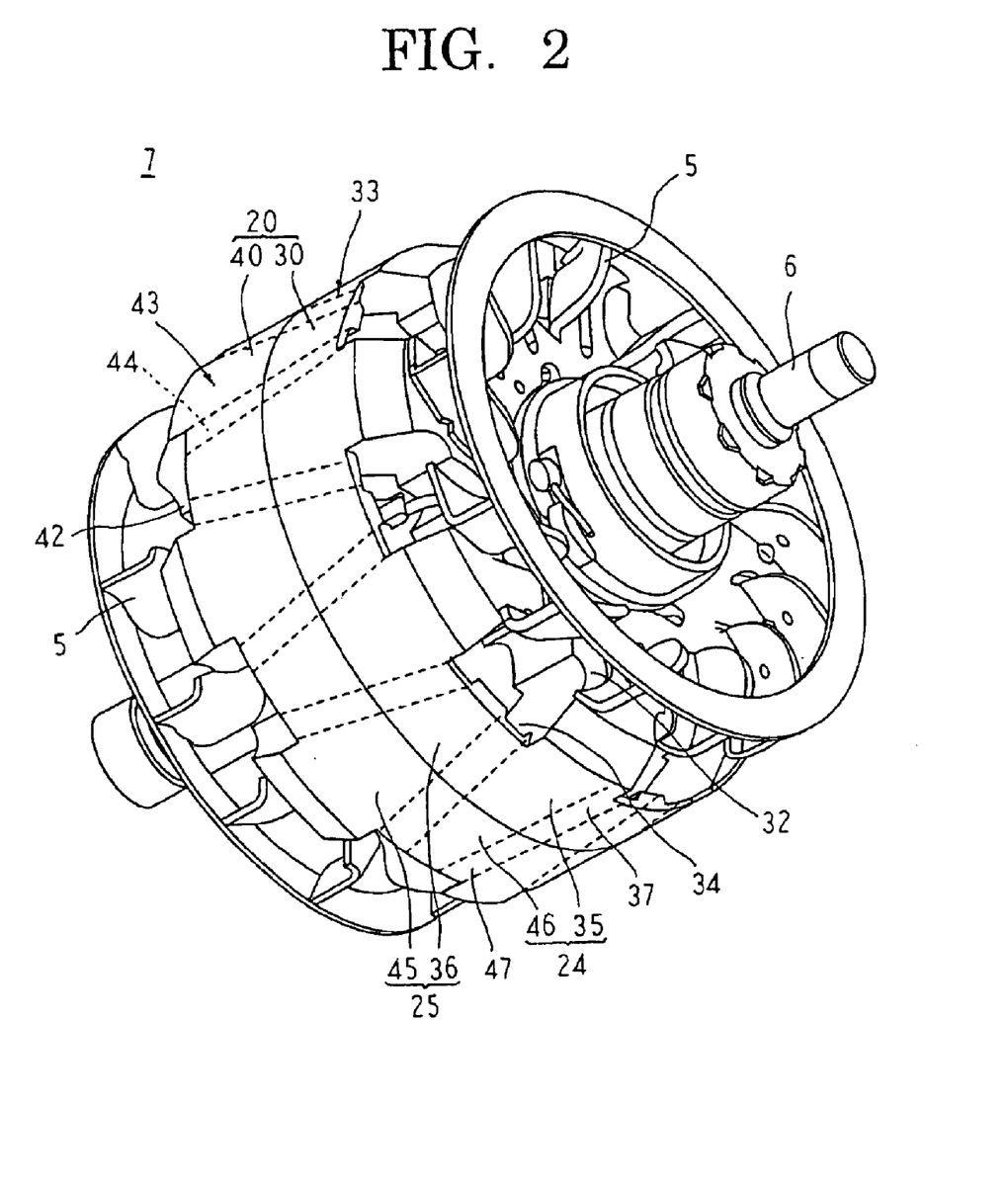
FIG. 2 is a perspective showing a rotor of the automotive alternator according to Embodiment 1 of the present invention.
Figure 3:
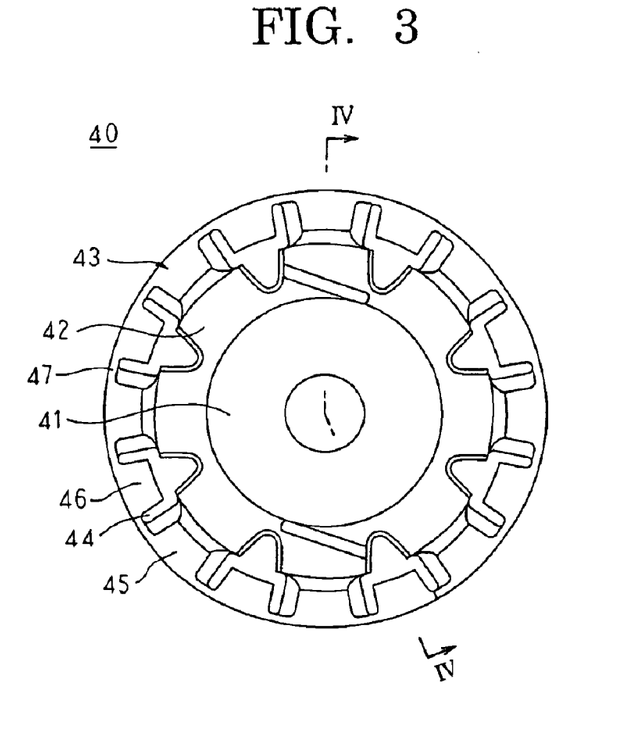
FIG. 3 is a front elevation showing a divided core of the rotor of the automotive alternator according to Embodiment 1 of the present invention viewed from a side near a dividing surface.
Figure 4:
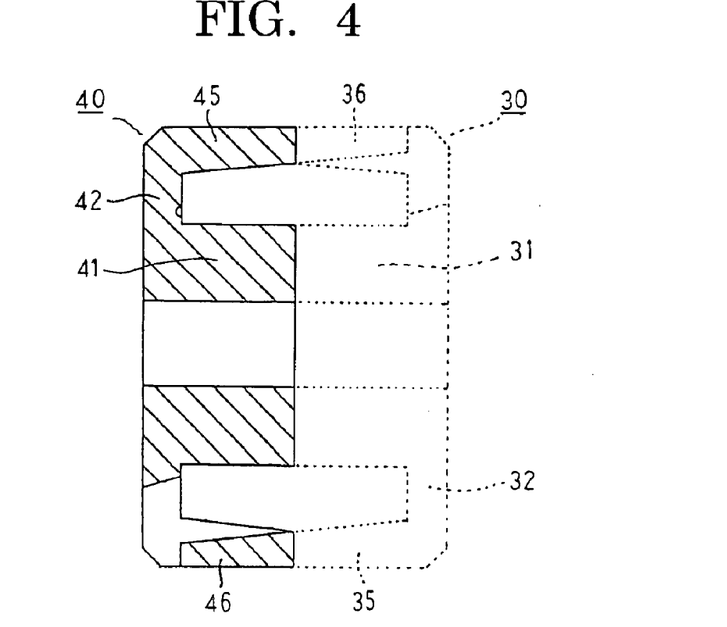
FIG. 4 is a cross section taken along line IV—IV in FIG. 3 viewed in the direction of the arrows.

FIG. 1 is a longitudinal section showing an automotive alternator according to Embodiment 1 of the present invention, FIG. 2 is a perspective showing a rotor of the automotive alternator according to Embodiment 1 of the present invention, FIG. 3 is a front elevation showing a divided core of the rotor of the automotive alternator according to Embodiment 1 of the present invention viewed from a side near a dividing surface, and FIG. 4 is a cross section taken along line IV—IV in FIG. 3 viewed in the direction of the arrows. Moreover, in FIG. 4, a first core division is indicated by broken lines to facilitate explanation.

In FIG. 1, an automotive alternator functioning as a dynamoelectric machine is provided with: a case 3 constituted by a front bracket 1 and a rear bracket 2 made of aluminum; a shaft 6 disposed inside the case 3; a pulley 4 being secured to a first end portion of the shaft 6; a rotor 7 secured to the shaft 6; fans 5 secured to first and second axial end portions of the rotor 7; a stator 8 secured to the case 3 so as to envelop the rotor 7; slip rings 9 secured to a second end portion of the shaft 6 for supplying an electric current to the rotor 7; a pair of brushes 10 sliding on surfaces of the slip rings 9; a brush holder 11 for housing the brushes 10; a rectifier 12 electrically connected to the stator 8 for converting an alternating current generated in the stator 8 into a direct current; and a regulator 15 mounted to a heat sink 17 fitted onto the brush holder 11, the regulator 15 adjusting the magnitude of an alternating voltage generated in the stator 8.

The stator 8 is constituted by: a cylindrical stator core 13; and a stator coil 14 installed in the stator core 13.

The rotor 7 is constituted by: a rotor core 20; and a field coil 19 installed in the rotor core 20. This rotor core 20 is constituted by: a cylindrical portion 21 onto which the field coil 19 is wound; first and second yoke portions 22 and 23 disposed so as to extend from outer peripheral edge portions at first and second axial ends of the cylindrical portion 21; and first and second claw-shaped magnetic poles 24 and 25 disposed so as to extend axially from outer peripheral portions of each of the yoke portions 22 and 23 so as to cover the cylindrical portion 21. The first and second claw-shaped magnetic poles 24 and 25 are formed with a tapered shape in which a circumferential width gradually narrows from a root region toward a tip end and a radial thickness becomes gradually thinner from the root region toward the tip end. Eight first claw-shaped magnetic poles 24 are disposed at a uniform angular pitch in a circumferential direction so as to extend axially from outer peripheral portions of the first yoke portion 22 that is disposed so as to extend radially from the outer peripheral edge portion at the first axial end of the cylindrical portion 21. Similarly, eight second claw-shaped magnetic poles 25 are disposed at a uniform angular pitch in a circumferential direction so as to extend axially from outer peripheral portions of the second yoke portion 23 that is disposed so as to extend radially from the outer peripheral edge portion at the second axial end of the cylindrical portion 21. These first and second claw-shaped magnetic poles 24 and 25 are linked on an outer peripheral surface side by a thin layer portion described below and are arranged so as to line up alternately in a circumferential direction to constitute a cylindrical magnetic pole portion. The field coil 19 is mounted in a space surrounded by the cylindrical portion 21, the yoke portions 22 and 23, and the cylindrical magnetic pole portion. This rotor 7 is rotatably mounted inside the case 3 by means of the shaft 6 which is inserted through and fixed at a central axial position of the cylindrical portion 21.

In an automotive alternator constructed in this manner, an electric current is supplied to the field coil 19 from a battery (not shown) by means of the brushes 10 and the slip rings 9, generating a magnetic flux. The first claw-shaped magnetic poles 24 are magnetized into South-seeking (S) poles by this magnetic flux, and the second claw-shaped magnetic poles 25 are magnetized into North-seeking (N) poles. At the same time, rotational torque from an engine is transmitted to the shaft 6 by means of a belt and the pulley 4, rotating the rotor 7. Thus, a rotating magnetic field is imparted to the stator coil 14, generating an electromotive force in the stator coil 14. This alternating-current electromotive force passes through the rectifier 12, is converted into a direct current, and the magnitude thereof is adjusted by the regulator 15 to charge the battery.

Next, a configuration of the rotor 7 will be explained with reference to FIGS. 2 to 4.

The rotor core 20 is divided at a central position in an axial direction into two sections constituted by first and second core divisions 30 and 40.

The first core division 30 is prepared as a solid body of a magnetic material such as iron, etc., and includes: a first cylindrical sub-portion 31; a first yoke portion 32 disposed so as to extend radially from an outer peripheral edge portion at a first axial end of the first cylindrical sub-portion 31; and a first cylindrical magnetic pole sub-portion 33 linked to an outer peripheral portion of the first yoke portion 32 and formed so as to be concentric with the first cylindrical sub-portion 31. First recessed grooves 34 are recessed into an inner peripheral surface of the first cylindrical magnetic pole sub-portion 33 to form first and second magnetic pole divisions 35 and 36 arranged alternately in a circumferential direction. These first and second magnetic pole divisions 35 and 36 are separated on an inner peripheral side by the first recessed grooves 34, and linked on an outer peripheral side by a first thin layer portion 37 constituted by floor portions of the first recessed grooves 34.

The second core division 40 is prepared as a solid body of a magnetic material such as iron, etc., and includes: a second cylindrical sub-portion 41; a second yoke portion 42 disposed so as to extend radially from an outer peripheral edge portion at a second axial end of the second cylindrical sub-portion 41; and a second cylindrical magnetic pole sub-portion 43 linked to an outer peripheral portion of the second yoke portion 42 and formed so as to be concentric with the second cylindrical sub-portion 41. Second recessed grooves 44 are recessed into an inner peripheral surface of the first cylindrical magnetic pole sub-portion 43 to form third and fourth magnetic pole divisions 45 and 46 arranged alternately in a circumferential direction. These third and fourth magnetic pole divisions 45 and 46 are separated by the second recessed grooves 44 on an inner peripheral side, and linked by a second thin layer portion 47 on an outer peripheral side constituted by floor portions of the second recessed grooves 44.

The rotor 7 is assembled by installing the field coil 19 on the first and second cylindrical sub-portions 31 and 41, and press-fitting the shaft 6 into a shaft insertion aperture disposed through the first cylindrical sub-portion 31 and the second cylindrical sub-portion 41 at a central axial position. Thus, end surfaces of the first cylindrical sub-portion 31 and the second cylindrical sub-portion 41 are placed in contact with each other and magnetically connected by insertion pressure from the shaft 6, and end surfaces of the first and second magnetic pole divisions 35 and 36 and the third and fourth magnetic pole divisions 45 and 46 are placed in contact with each other and magnetically connected by the insertion pressure from the shaft 6. Here, the first cylindrical sub-portion 31 and the second cylindrical sub-portion 41 are placed in contact with each other to constitute the cylindrical portion 21, the first yoke portion 32 constitutes the first yoke portion 22, and the second yoke portion 42 constitutes the second yoke portion 23. The first magnetic pole divisions 35 and the fourth magnetic pole divisions 46 are placed in contact with each other to constitute the tapered first claw-shaped magnetic poles 24, and the second magnetic pole divisions 36 and the third magnetic pole divisions 45 are placed in contact with each other to constitute the tapered second claw-shaped magnetic poles 25. In addition, the first recessed grooves 34 and the second recessed grooves 44 are linked in straight lines to constitute recessed grooves passing through from a first axial end to a second axial end of the rotor core 20.

Moreover, the outer peripheral sides of the first and second claw-shaped magnetic poles 24 and 25 are linked by the first and second thin layer portions 37 and 47, but the first and second thin layer portions 37 and 47 are saturated by even a little magnetic flux, and the magnetic properties of the first and second thin layer portions 37 and 47 after saturation are equivalent to those of air.

According to Embodiment 1, because the rotor core 20 is constituted by first and second core divisions 30 and 40 each prepared as a solid body of a magnetic material such as iron, etc., the strength of the first and second claw-shaped magnetic poles 24 and 25 themselves is increased. Thus, the first and second claw-shaped magnetic poles 24 and 25 are prevented from disintegrating during high-speed rotation of the rotor 7. In addition, because the first and second claw-shaped magnetic poles 24 and 25 are prevented from deforming due to stresses generated in the first and second claw-shaped magnetic poles 24 and 25 during the assembly process in which the shaft 6 is pressed into the first and second core divisions 30 and 40, irregularities in output from the rotor 7 resulting from deformation of the first and second claw-shaped magnetic poles 24 and 25 are reduced. Furthermore, in rotor cores constructed by laminating steel plates, one disadvantage has been that layers of air form between the laminated steel plates, increasing magnetic resistance and making output deteriorate, but in Embodiment 1, problems of this kind do not occur.

Because the outer peripheral sides of the first and second claw-shaped magnetic poles 24 and 25 are linked by the first and second thin layer portions 37 and 47, the outer peripheral surface of the rotor 7 becomes smooth, enabling wind-splitting noise resulting from irregularities on the outer peripheral surface of the rotor 7 to be reduced.

Because the first and second recessed grooves 34 and 35 separating the first and second claw-shaped magnetic poles 24 and 25 on the inner peripheral side are formed so as to link up in a straight line and pass through the rotor core 20 from the first axial end to the second axial end, a cooling airflow from the fans 5 flows through the first and second recessed grooves 34 and 35 while the automotive alternator is operating, enabling temperature increases in the rotor 7 to be suppressed.

Because the rotor core 20 is divided at a central position in an axial direction into two sections, the first and second core divisions 30 and 40 have an identical shape, enabling the number of parts to be reduced and costs to be lowered.

Because the cylindrical magnetic pole portion is divided in an axial direction into first and second cylindrical magnetic pole sub-portions 33 and 43, machining of the first and second recessed grooves 37 and 47, etc., is facilitated, improving machinability.

Because the first and second claw-shaped magnetic poles 24 and 25 are formed so as to be tapered, changes in magnetic flux density in the first and second claw-shaped magnetic poles 24 and 25 are reduced, enabling high output.

Embodiment 2

Figure 5:
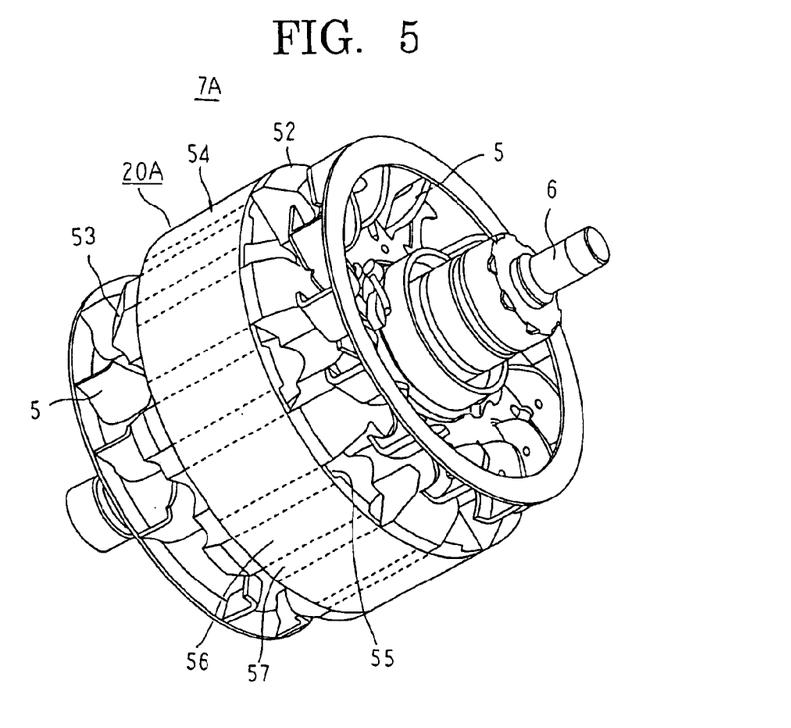
FIG. 5 is a perspective showing a rotor of an automotive alternator according to Embodiment 2 of the present invention.
Figure 6:
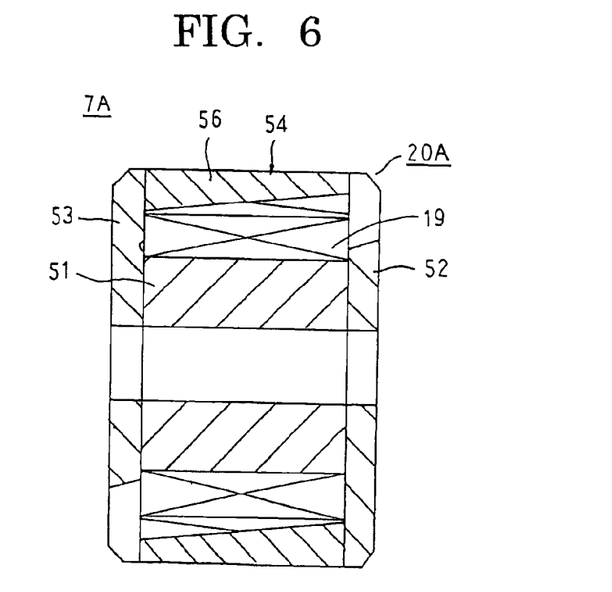
FIG. 6 is a longitudinal section showing a rotor core of the rotor of the automotive alternator according to Embodiment 2 of the present invention.

FIG. 5 is a perspective showing a rotor of an automotive alternator according to Embodiment 2 of the present invention, and FIG. 6 is a longitudinal section showing a rotor core of the rotor of the automotive alternator according to Embodiment 2 of the present invention.

In FIGS. 5 and 6, a rotor core 20A is constructed so as to be divided into a cylindrical portion 51, first and second yoke portions 52 and 53, and a cylindrical magnetic pole portion 54, each prepared as a solid body of a magnetic material such as iron, etc. Recessed grooves 55 having a groove direction lying in an axial direction are recessed into an inner peripheral surface of the cylindrical magnetic pole portion 54 at a uniform angular pitch in a circumferential direction, and claw-shaped magnetic poles 56 are formed so as to be arranged at a uniform angular pitch in a circumferential direction. These claw-shaped magnetic poles 56 are separated on an inner peripheral side by the recessed grooves 55, and linked on an outer peripheral side by a thin layer portion 57 constituted by floor portions of the recessed grooves 55. The claw-shaped magnetic poles 56 are formed with a tapered shape in which a circumferential width is constant and a radial thickness becomes gradually thinner from a root region toward a tip end.

A field coil 19 is installed on the cylindrical portion 51, the cylindrical magnetic pole portion 54 is disposed so as to cover the cylindrical portion 51, and the first and second yoke portions 52 and 53 are disposed on first and second axial ends of the cylindrical portion 51. A rotor 7A is assembled by press-fitting a shaft 6 into a shaft insertion aperture disposed through the cylindrical portion 51 and the first and second yoke portions 52 and 53 at a central axial position. Thus, end surfaces of the cylindrical portion 51 and the first and second yoke portions 52 and 53 are placed in contact with each other and magnetically connected by insertion pressure from the shaft 6, and end surfaces of the first and second yoke portions 52 and 53 and the cylindrical magnetic pole portion 54 are placed in contact with each other and magnetically connected by the insertion pressure from the shaft 6. Furthermore, the first and second yoke portions 52 and 53 and the cylindrical magnetic pole portion 54 are integrated, for example, by disposing engaging pins so as to stand on an end surface of the first and second yoke portions 52 and 53 and extend in an axial direction, recessing engaging apertures in end surfaces of the cylindrical magnetic pole portion 54, and pressing the engaging pins into the engaging apertures before press-fitting the shaft 6.

Moreover, the outer peripheral sides of adjacent claw-shaped magnetic poles 56 are linked by the thin layer portion 57, but the thin layer portion 57 is saturated by even a little magnetic flux, and the magnetic properties of the thin layer portion 57 after saturation are equivalent to those of air.

Consequently, in Embodiment 2, because the cylindrical magnetic pole portion 54 of the rotor core 20A is prepared as a solid body of a magnetic material such as iron, etc., the strength of the claw-shaped magnetic poles 56 themselves is increased. Thus, the claw-shaped magnetic poles 56 are prevented from disintegrating during high-speed rotation of the rotor 7A. In addition, because the claw-shaped magnetic poles 56 are prevented from deforming due to stresses generated in the claw-shaped magnetic poles 56 during the assembly process in which the shaft 6 is pressed into the cylindrical portion 51 and the first and second yoke portions 52 and 53, irregularities in output from the rotor 7A resulting from deformation of the claw-shaped magnetic poles 56 are reduced.

Because the outer peripheral sides of the claw-shaped magnetic poles 56 are linked by the thin layer portion 57, the outer peripheral surface of the rotor 7A becomes smooth, enabling wind-splitting noise resulting from irregularities on the outer peripheral surface of the rotor 7A to be reduced.

Because the recessed grooves 55 separating adjacent claw-shaped magnetic poles 56 on the inner peripheral side are formed so as to pass through the rotor core 20A in a straight line from a first axial end to a second axial end, a cooling airflow from the fans 5 flows through the recessed grooves 55 while the automotive alternator is operating, enabling temperature increases in the rotor 7A to be suppressed.

Because the first and second yoke portions 52 and 53 and the cylindrical magnetic pole portion 56 are divided, the cylindrical magnetic pole portion 56 can be prepared independently, increasing machinability. Because the recessed grooves 55 have a groove direction lying in an axial direction, groove machining is facilitated.

Embodiment 3

Figure 7:
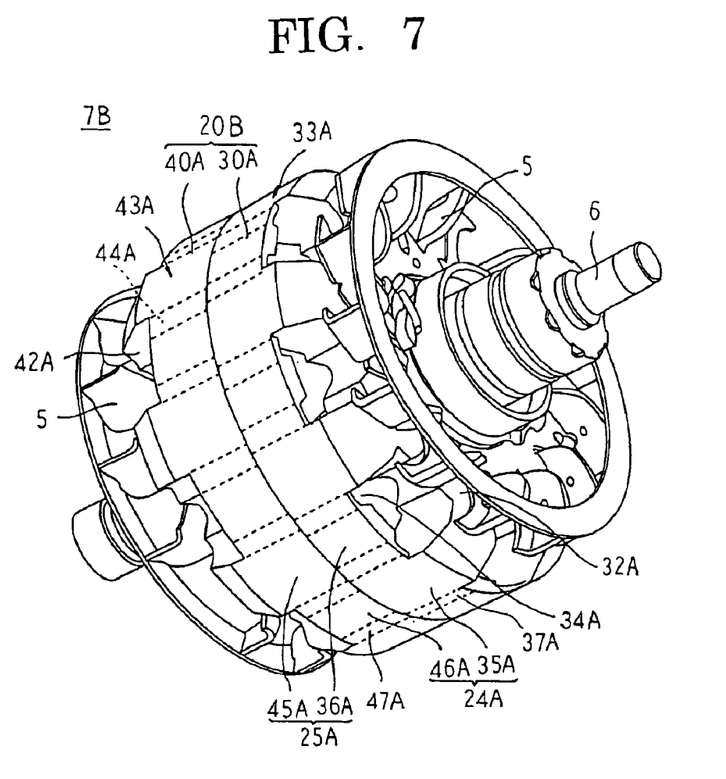
FIG. 7 is a perspective showing a rotor of an automotive alternator according to Embodiment 3 of the present invention.
Figure 8:
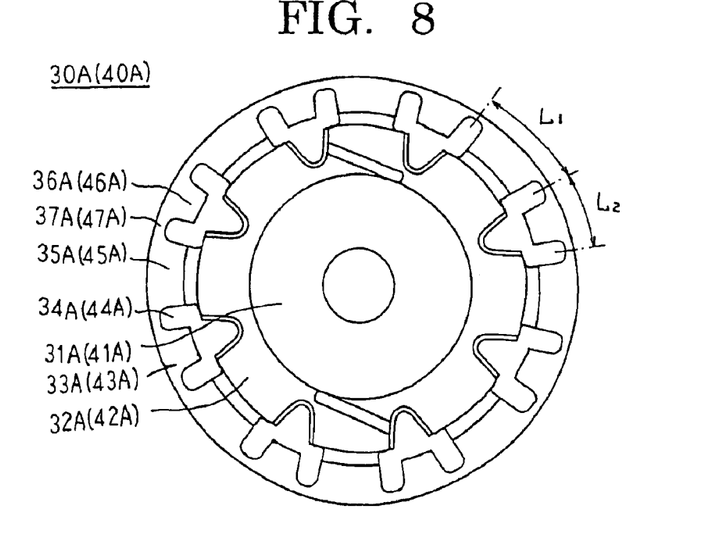
FIG. 8 is a front elevation showing a divided core of the rotor of the automotive alternator according to Embodiment 3 of the present invention viewed from a side near a dividing surface.

FIG. 7 is a perspective showing a rotor of an automotive alternator according to Embodiment 3 of the present invention, and FIG. 8 is a front elevation showing a divided core of the rotor of the automotive alternator according to Embodiment 3 of the present invention viewed from a side near a dividing surface.

In FIGS. 7 and 8, a rotor core 20B is divided at a central position in an axial direction into two sections constituted by first and second core divisions 30A and 40A.

The first core division 30A is prepared as a solid body of a magnetic material such as iron, etc., and includes: a first cylindrical sub-portion 31A; a first yoke portion 32A disposed so as to extend radially from an outer peripheral edge portion at a first axial end of the first cylindrical sub-portion 31A; and a first cylindrical magnetic pole sub-portion 33A linked to an outer peripheral portion of the first yoke portion 32A and formed so as to be concentric with the first cylindrical sub-portion 31A. First recessed grooves 34A having a groove direction lying in an axial direction are recessed into an inner peripheral surface of the first cylindrical magnetic pole sub-portion 33A so as to alternate between a first pitch $L_1$ and a second pitch $L_2$ to form first and second magnetic pole divisions 35A and 36A arranged alternately in a circumferential direction. These first and second magnetic pole divisions 35A and 36A are separated on an inner peripheral side by the first recessed grooves 34A, and linked on an outer peripheral side by a first thin layer portion 37A constituted by floor portions of the first recessed grooves 34A.

The second core division 40A is prepared as a solid body of a magnetic material such as iron, etc., and includes: a second cylindrical sub-portion 41A; a second yoke portion 42A disposed so as to extend radially from an outer peripheral edge portion at a second axial end of the second cylindrical sub-portion 41A; and a second cylindrical magnetic pole sub-portion 43A linked to an outer peripheral portion of the second yoke portion 42A and formed so as to be concentric with the second cylindrical sub-portion 41A. Second recessed grooves 44A having a groove direction lying in an axial direction are recessed into an inner peripheral surface of the first cylindrical magnetic pole sub-portion 43A so as to alternate between a first pitch $L_1$ and a second pitch $L_2$ to form third and fourth magnetic pole divisions 45A and 46A arranged alternately in a circumferential direction. These third and fourth magnetic pole divisions 45A and 46A are separated by the second recessed grooves 44A on an inner peripheral side, and linked by a second thin layer portion 47A on an outer peripheral side constituted by floor portions of the second recessed grooves 44A.

Here, the first pitch $L_1$ is greater than the second pitch $L_2$ ($L_1 > L_2$), making the circumferential width of the first magnetic pole divisions 35A (which is equal to the circumferential width of the third magnetic pole divisions 45A) greater than the circumferential width of the second magnetic pole divisions 36A (which is equal to the circumferential width of the fourth magnetic pole divisions 46A).

A rotor 7B is assembled by installing a field coil 19 (not shown) on the first and second cylindrical sub-portions 31A and 41A, and press-fitting the shaft 6 into a shaft insertion aperture disposed through the first cylindrical sub-portion 31A and the second cylindrical sub-portion 41A at a central axial position. Thus, end surfaces of the first cylindrical sub-portion 31A and the second cylindrical sub-portion 41A are placed in contact with each other and magnetically connected by insertion pressure from the shaft 6, and end surfaces of the first and second magnetic pole divisions 35A and 36A and the third and fourth magnetic pole divisions 45A and 46A are placed in contact with each other and magnetically connected by the insertion pressure from the shaft 6. Here, the first cylindrical sub-portion 31A and the second cylindrical sub-portion 41A are placed in contact with each other to constitute a cylindrical portion. The first magnetic pole divisions 35A and the fourth magnetic pole divisions 46A are placed in contact with each other to constitute first claw-shaped magnetic poles 24A, and the second magnetic pole divisions 36A and the third magnetic pole divisions 45A are placed in contact with each other to constitute second claw-shaped magnetic poles 25A. In addition, the first recessed grooves 34A and the second recessed grooves 44A are offset from each other in a circumferential direction so as to be linked in a stepped pattern to constitute recessed grooves passing through from a first axial end to a second axial end of the rotor core 20B.

Here, the outer peripheral sides of the first and second claw-shaped magnetic poles 24A and 25A are linked by the first and second thin layer portions 37A and 47A, but the first and second thin layer portions 37A and 47A are saturated by even a little magnetic flux, and the magnetic properties of the first and second thin layer portions 37A and 47A after saturation are equivalent to those of air.

The first and second claw-shaped magnetic poles 24A and 25A are formed with a tapered shape in which a radial thickness becomes gradually thinner from a root region toward a tip end and a circumferential width narrows in a stepped pattern from the root region toward the tip end.

In Embodiment 3, because the first and second cylindrical magnetic pole sub-portions 33A and 43A of the rotor core 20B are each prepared from a solid body of a magnetic material such as iron, etc., disintegration of the first and second claw-shaped magnetic poles 24A and 25A during high-speed rotation of the rotor 7B and the occurrence of deformation of the first and second claw-shaped magnetic poles 24A and 25A during assembly processes are also suppressed in a similar manner to Embodiment 1 above.

Because the outer peripheral sides of the first and second claw-shaped magnetic poles 24A and 25A are linked by the first and second thin layer portions 37A and 47A, wind-splitting noise resulting from irregularities on the outer peripheral surface of the rotor 7B can be reduced.

Because the first and second recessed grooves 37A and 47A are formed so as to pass through the rotor core 20B in an axial direction from the first end to the second end, the rotor 7B can be cooled efficiently.

Because the rotor core 20B is divided at a central position in an axial direction into two sections constituted by first and second core divisions 30A and 40A, the first and second core divisions 30A and 40A have an identical shape, enabling costs to be lowered. Because the cylindrical magnetic pole portion is divided in an axial direction into first and second cylindrical magnetic pole sub-portions 33A and 43A, machining of the first and second recessed grooves 37A and 47A is facilitated. In addition, because the first and second recessed grooves 37A and 47A are formed so as to have a groove direction lying in an axial direction, groove machining is facilitated.

Because the first and second recessed grooves 37A and 47A are offset from each other in a circumferential direction so as to be linked in a stepped pattern, leakage of magnetic flux between the first and second claw-shaped magnetic poles 24A and 25A can be suppressed.

Embodiment 4

Figure 9:
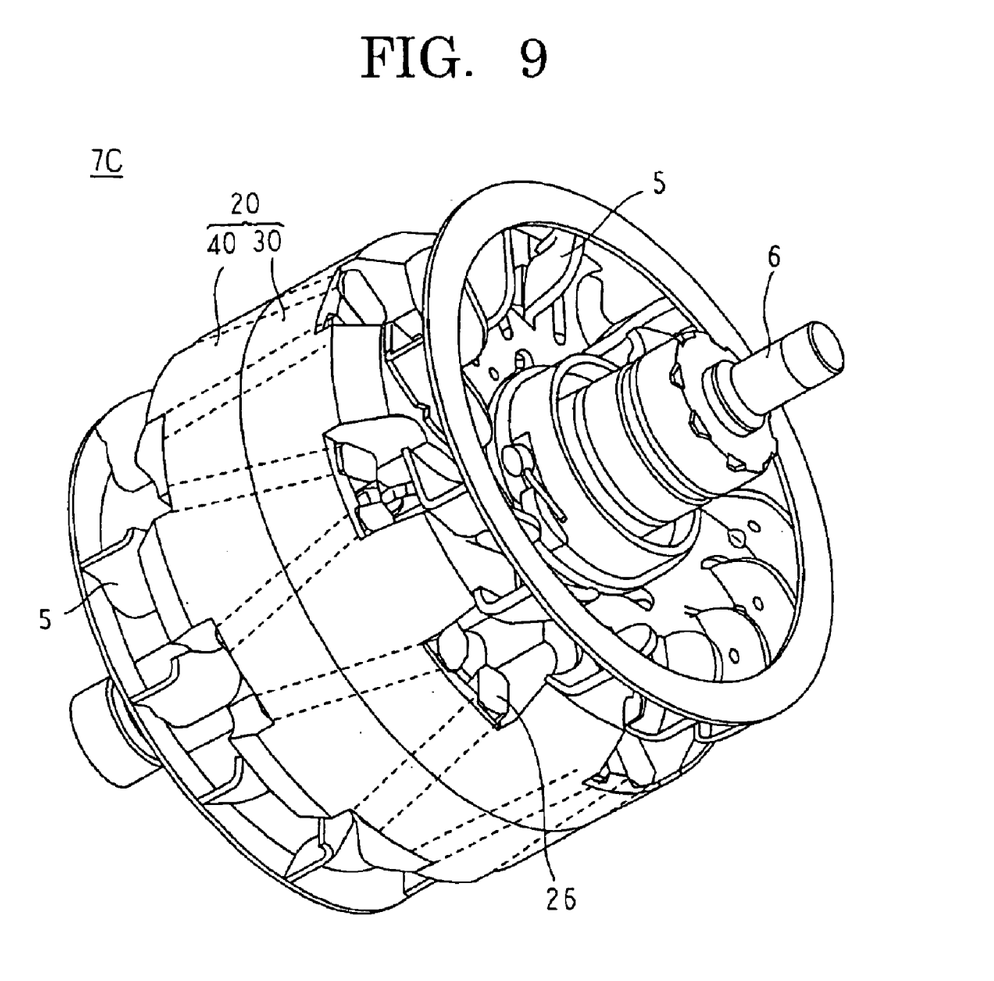
FIG. 9 is a perspective showing a rotor of an automotive alternator according to Embodiment 4 of the present invention.
Figure 10:
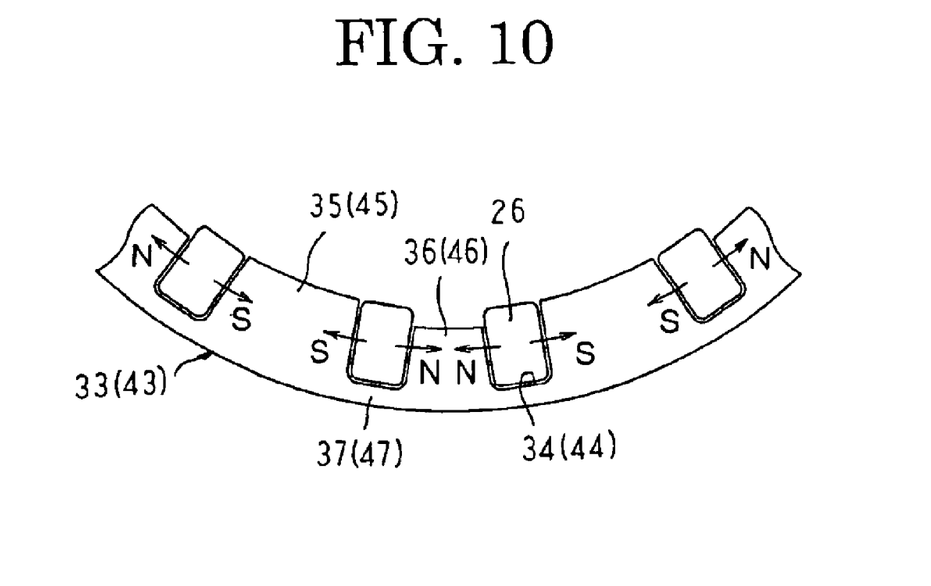
FIG. 10 is a diagram explaining directions of magnetization of permanent magnets in the rotor of the automotive alternator according to Embodiment 4 of the present invention.

FIG. 9 is a perspective showing a rotor of an automotive alternator according to Embodiment 4 of the present invention, and FIG. 10 is a diagram explaining directions of magnetization of permanent magnets in the rotor of the automotive alternator according to Embodiment 4 of the present invention.

In FIG. 9, permanent magnets 26 are mounted inside first and second recessed grooves 34 and 44 linked in straight lines. Each of the permanent magnets 26 is magnetized such that its magnetomotive force is aligned in a circumferential direction as shown in FIG. 10.

Here, the permanent magnets 26 may be installed in a rotor core 20 in a magnetized state, or they may be magnetized after being installed in the rotor core 20.

Moreover, a rotor 7C is constructed in a similar manner to the rotor 7 in Embodiment 1 above except for the fact that the permanent magnets 26 are mounted.

In Embodiment 4, because the permanent magnets 26 disposed between the first and second claw-shaped magnetic poles 24 and 25 are magnetized such that their magnetomotive forces are aligned in a circumferential direction, magnetic flux leakage between the first and second claw-shaped magnetic poles 24 and 25 is reduced, enabling high output.

Embodiment 5

Figure 11:
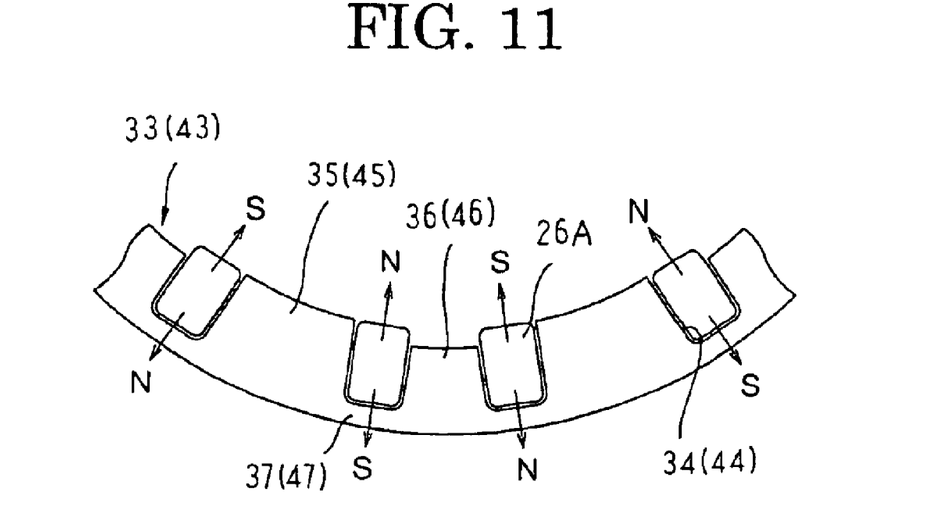
FIG. 11 is a diagram explaining directions of magnetization of permanent magnets in a rotor of an automotive alternator according to Embodiment 5 of the present invention.

In Embodiment 4 above, the permanent magnets 26 mounted inside the first and second recessed grooves 34 and 44 are magnetized such that their magnetomotive forces are aligned in a circumferential direction, but in Embodiment 5, as shown in FIG. 11, permanent magnets 26A are magnetized such that their magnetomotive forces are aligned in a radial direction.

According to Embodiment 5, because the permanent magnets 26A are magnetized such that their magnetomotive forces are aligned in a radial direction, the main magnetic flux flowing toward the stator is increased, enabling high output.

Figure 12:
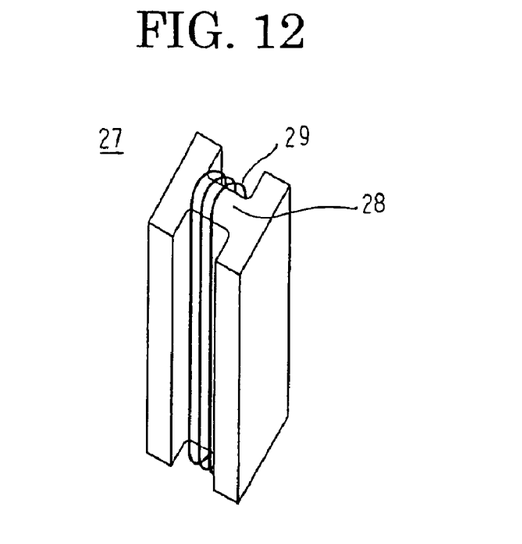
FIG. 12 is a perspective showing a preferred variation of magnets used in the rotor of the automotive alternator according to Embodiment 4 of the present invention.

Moreover, in Embodiments 4 and 5 above, permanent magnets 26 and 26A are mounted inside first and second recessed grooves 34 and 44, but similar effects can also be achieved using electromagnets 27 such as those shown in FIG. 12 made by winding a coil 29 around a core 28 instead of the permanent magnets 26 and 26A.

Embodiment 6

Figure 13:
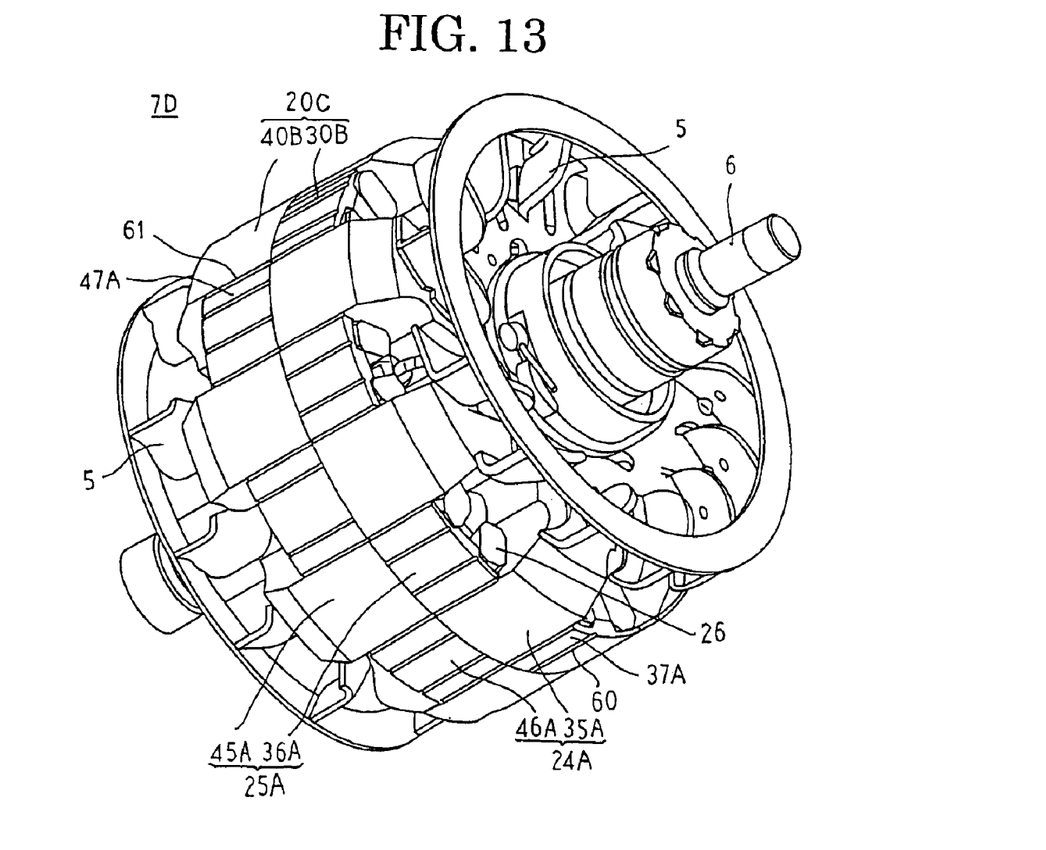
FIG. 13 is a perspective showing a rotor of an automotive alternator according to Embodiment 6 of the present invention.

FIG. 13 is a perspective showing a rotor of an automotive alternator according to Embodiment 6 of the present invention.

In FIG. 13, a rotor core 20C is divided at a central position in an axial direction into two sections constituted by first and second core divisions 30B and 40B.

The first core division 30B is formed in a similar manner to the first core division 30A in Embodiment 3 above except for the fact that first notches 60 functioning as magnetic resistance increasing portions are formed on an outer peripheral surface. These first notches 60 are formed on an outer peripheral surface of the first thin layer portion 37A constituted by the floor portions of the first recessed grooves 34A so as to have a groove direction lying in an axial direction and extend from a first axial end to a second axial end of the first thin layer portion 37A. Permanent magnets 26 are mounted inside the first recessed grooves 34A.

The second core division 40B is formed in a similar manner to the second core division 40A in Embodiment 3 above except for the fact that second notches 61 functioning as magnetic resistance increasing portions are formed on an outer peripheral surface. These second notches 61 are formed on an outer peripheral surface of the second thin layer portion 47A constituted by the floor portions of the second recessed grooves 44A so as to have a groove direction lying in an axial direction and extend from a first axial end to a second axial end of the second thin layer portion 47A. Permanent magnets 26 are mounted inside the second recessed grooves 44A.

In a rotor 7D constructed in this manner, because first and second notches 60 and 61 having a groove direction lying in an axial direction are formed on outer peripheral surfaces of the first and second thin layer portions 37A and 47A, the cross-sectional area of the first and second thin layer portions 37A and 47A relative to flat surfaces including the central axis at the position of formation of the first and second notches 60 and 61 decreases. Thus, magnetic resistance between the first and second claw-shaped magnetic poles 24A and 25A increases, and magnetic flux leakage between the first and second claw-shaped magnetic poles 24A and 25A decreases, enabling high output.

Moreover, in Embodiment 6 above, the first and second notches 60 and 61 are formed on outer peripheral surfaces of the first and second thin layer portions 37A and 47A, but the first and second notches 60 and 61 may also be formed on inner peripheral surfaces of the first and second thin layer portions 37A and 47A, or they may also be formed on both outer peripheral surfaces and inner circumferential surfaces of the first and second thin layer portions 37A and 47A.

In Embodiment 6 above, two first and second notches 60 and 61 are formed on the outer peripheral surfaces of each of the first and second thin layer portions 37A and 47A, but the number of first and second notches 60 and 61 may also be one, or may also be three or more.

In Embodiment 6 above, the first and second notches 60 and 61 are formed so as to have groove directions lying in an axial direction, but the groove directions of the first and second notches 60 and 61 are not limited to the axial direction, and it is sufficient if they are formed within a region of the first and second thin layer portions 37A and 47A.

In Embodiment 6 above, the notches are disposed on the cylindrical magnetic pole portion of a rotor core according to Embodiment 3 above, but similar effects can also be achieved if the notches are disposed on the cylindrical magnetic pole portion of a rotor core of the other embodiments.

In Embodiment 6 above, first and second notches 60 and 61 are disposed as magnetic resistance increasing portions, but magnetic resistance increasing portions may also be formed by applying plastic working such as shot peening, etc., to the first and second thin layer portions 37A and 47A.

Embodiment 7

Figure 14:
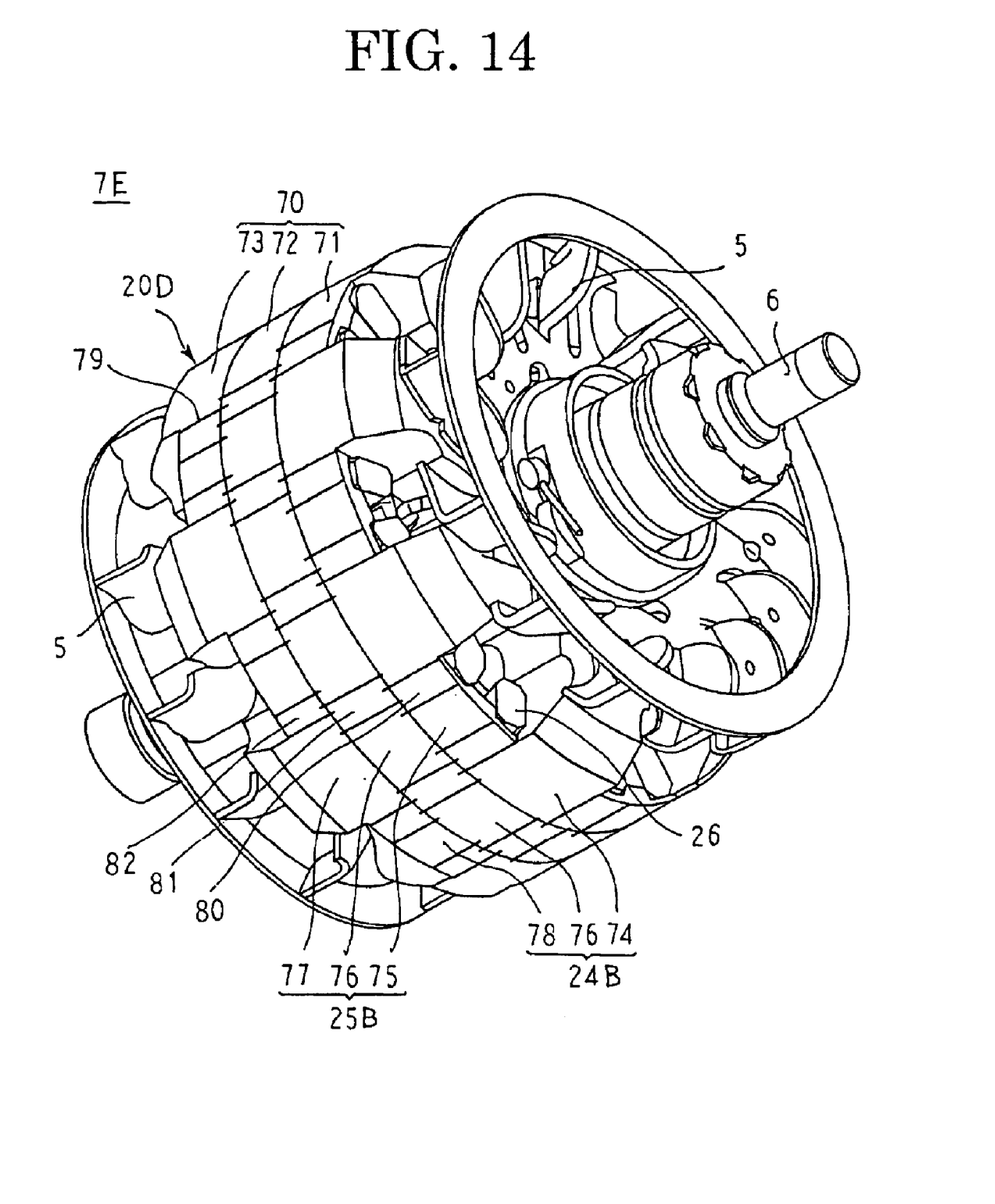
FIG. 14 is a perspective showing a rotor of an automotive alternator according to Embodiment 7 of the present invention.

FIG. 14 is a perspective showing a rotor of an automotive alternator according to Embodiment 7 of the present invention.

In FIG. 14, in a rotor core 20D, a cylindrical magnetic pole portion 70 is divided in an axial direction into three sections constituted by a first cylindrical magnetic pole sub-portion 71, a second cylindrical magnetic pole sub-portion 72, and a third cylindrical magnetic pole sub-portion 73. First recessed grooves having a groove direction lying in an axial direction are recessed into an inner peripheral surface of the first cylindrical magnetic pole sub-portion 71 to form first and second magnetic pole divisions 74 and 75 arranged alternately in a circumferential direction. Second recessed grooves having a groove direction lying in an axial direction are recessed into an inner peripheral surface of the second cylindrical magnetic pole sub-portion 72 to form third magnetic pole divisions 76 arranged in a circumferential direction. In addition, third recessed grooves having a groove direction lying in an axial direction are recessed into an inner peripheral surface of the third cylindrical magnetic pole sub-portion 73 to form fourth and fifth magnetic pole divisions 77 and 78 arranged alternately in a circumferential direction.

The first, second, and third recessed grooves are constructed so as to be offset from each other in a circumferential direction, to be linked in a stepped pattern, and to extend from a first axial end to a second axial end of the cylindrical magnetic pole portion 70.

The first, third, and fifth magnetic pole divisions 74, 76, and 78 are connected magnetically by placing their end surfaces in contact with each other to constitute first claw-shaped magnetic poles 24B. The first claw-shaped magnetic poles 24B are formed with a tapered shape in which a circumferential width narrows in a stepped pattern from a root portion toward a tip end and a radial thickness becomes gradually thinner from the root portion toward the tip end. The second, third, and fourth magnetic pole divisions 75, 76, and 77 are connected magnetically by placing their end surfaces in contact with each other to constitute second claw-shaped magnetic poles 25A. The second claw-shaped magnetic poles 25A are formed with a tapered shape in which a circumferential width narrows in a stepped pattern from a root portion toward a tip end and a radial thickness becomes gradually thinner from the root portion toward the tip end. Permanent magnets 26 are mounted inside the first, second, and third recessed grooves.

The first cylindrical magnetic pole sub-portion 71, the second cylindrical magnetic pole sub-portion 72, and the third cylindrical magnetic pole sub-portion 73 are integrated by welding. Weld beads 79 functioning as magnetic resistance increasing portions formed by this welding each have a bead direction lying in an axial direction, and are formed on outer peripheral surfaces of a first thin layer portion 80 constituted by floor portions of the first recessed grooves so as to extend from a first axial end of the first cylindrical magnetic pole sub-portion 71 onto the second cylindrical magnetic pole sub-portion 72, are formed on outer peripheral surfaces of a second thin layer portion 81 constituted by floor portions of the second recessed grooves such that first and second ends extend onto the first and third cylindrical magnetic pole sub-portions 71 and 73, and are formed on outer peripheral surfaces of a third thin layer portion 82 constituted by floor portions of the third recessed grooves so as to extend from a second axial end of the third cylindrical magnetic pole sub-portion 73 onto the second cylindrical magnetic pole sub-portion 72.

Moreover, the rest of this embodiment is constructed in a similar manner to Embodiment 3 above.

In a rotor 7E constructed in this manner, weld beads 79 having a bead direction lying in an axial direction are formed on outer peripheral surfaces of first, second, and third thin layer portions 80, 81, and 82. The weld beads 79 degrade magnetic properties of the first, second, and third thin layer portions 80, 81, and 82. Thus, magnetic resistance between the first and second claw-shaped magnetic poles 24B and 25B increases, and magnetic flux leakage between the first and second claw-shaped magnetic poles 24B and 25B decreases, enabling high output.

Because the first, second, and third cylindrical magnetic pole sub-portions 71, 72, and 73 are integrated by welding, the strength of the first and second claw-shaped magnetic poles 24B and 25B is increased, enabling use at even higher rotational frequencies.

Because the cylindrical magnetic pole portion 70 is divided in an axial direction into three sections constituted by the first, second, and third cylindrical magnetic pole sub-portions 71, 72, and 73, groove machining of the first, second, and third recessed grooves is facilitated. Furthermore, because the groove direction of the first, second, and third recessed grooves lies in an axial direction, groove machining is further facilitated.

Moreover, each of the above embodiments have been explained as they apply to automotive alternator rotors, but the present invention is not limited to automotive alternator rotors and may also be applied to rotors for automotive dynamoelectric machines such as automotive alternating-current electric motors, automotive electric motor-generators, etc., and may also further be applied to dynamoelectric rotors for marine vessels.

What is claimed is:

1. A dynamoelectric rotor comprising:
    a field coil; and
    a rotor core comprising:
        a cylindrical portion onto which said field coil is wound;
        yoke portions disposed so as to extend radially from first and second axial end portions of said cylindrical portion; and
        a cylindrical magnetic pole portion formed so as to be linked to said yoke portions and cover said field coil,
    wherein:
        said cylindrical magnetic pole portion is prepared as a solid body; and
        a plurality of magnetic poles are formed on said cylindrical magnetic pole portion so as to be arranged in a circumferential direction so as to be separated from each other on an inner peripheral side by recessed grooves recessed into an inner peripheral surface of said cylindrical magnetic pole portion, and linked to each other on an outer peripheral side by a thin layer portion constituted by floor portions of said recessed grooves.

2. The dynamoelectric rotor according to claim 1, wherein each of said recessed grooves is formed so as to pass through from a first axial end to a second axial end of said rotor core.

3. The dynamoelectric rotor according to claim 2, wherein each of said recessed grooves is formed such that each of said plurality of magnetic poles is tapered.

4. The dynamoelectric rotor according to claim 3, wherein each of said recessed grooves is divided into a plurality of groove divisions in an axial direction, and said plurality of groove divisions are constructed so as to be offset from each other in a circumferential direction and linked in a stepped pattern.

5. The dynamoelectric rotor according to claim 2, wherein each of said recessed grooves is formed such that a groove direction is parallel to an axial direction of said rotor core.

6. The dynamoelectric rotor according to claim 5, wherein each of said recessed grooves is formed such that each of said plurality of magnetic poles is tapered.

7. The dynamoelectric rotor according to claim 6, wherein each of said recessed grooves is divided into a plurality of groove divisions in an axial direction, and said plurality of groove divisions are constructed so as to be offset from each other in a circumferential direction and linked in a stepped pattern.

8. The dynamoelectric rotor according to claim 1, wherein said yoke portions and said cylindrical magnetic pole portion are formed so as to be divided into sections.

9. The dynamoelectric rotor according to claim 1, wherein said cylindrical magnetic pole portion is formed so as to be divided into a plurality of sections in an axial direction.

10. The dynamoelectric rotor according to claim 9, wherein said cylindrical magnetic pole portion is formed so as to be divided into two sections at a central position in an axial direction.

11. The dynamoelectric rotor according to claim 1, wherein a magnet is mounted in each of said recessed grooves.

12. The dynamoelectric rotor according to claim 11, wherein said magnets are configured such that magnetomotive forces are aligned in a circumferential direction.

13. The dynamoelectric rotor according to claim 11, wherein said magnets are configured such that magnetomotive forces are aligned in a radial direction.

14. The dynamoelectric rotor according to claim 1, wherein a magnetic resistance increasing portion is formed on said thin layer portion so as to increase magnetic resistance between circumferentially-adjacent magnetic poles.

15. The dynamoelectric rotor according to claim 14, wherein said magnetic resistance increasing portion is constructed by disposing a notch so as to extend in an axial direction on at least one surface of an outer peripheral surface and an inner peripheral surface of said thin layer portion.

16. The dynamoelectric rotor according to claim 14, wherein said magnetic resistance increasing portion is constructed by disposing a weld bead so as to extend in an axial direction on an outer peripheral surface of said thin layer portion.

\* \* \* \* \*